United States Patent [19]

Reddick

[11] 4,298,254

[45] Nov. 3, 1981

[54] DEVICE FOR REAR VIEW VISION FOR SPECTACLES

[76] Inventor: Cornelius Reddick, 2 Forest St., Boston, Mass. 02119

[21] Appl. No.: 33,103

[22] Filed: Apr. 25, 1979

[51] Int. Cl.³ .......................... G02C 7/14; G02C 9/04
[52] U.S. Cl. .................................................... 351/50
[58] Field of Search .................. 351/50, 158; 350/298; 248/467; 2/14

[56] References Cited

U.S. PATENT DOCUMENTS

| 513,078 | 1/1894 | Bourns | 351/50 |
|---|---|---|---|
| 1,843,094 | 1/1932 | Rowan | 351/50 |
| 2,545,583 | 3/1951 | La Bard | 351/50 |
| 2,739,508 | 3/1956 | Reed | 351/50 |
| 2,917,970 | 12/1959 | La Bard | 350/298 |
| 3,498,293 | 3/1970 | Oppenheimer | 351/50 |

FOREIGN PATENT DOCUMENTS 3701 of 1885 United Kingdom .................. 351/50

Primary Examiner—John K. Corbin
Assistant Examiner—B. W. de los Reyes
Attorney, Agent, or Firm—Frank A. Steinhilper

[57] ABSTRACT

A rear view vision mirror attached to a pair of spectacles.

2 Claims, 5 Drawing Figures

DEVICE FOR REAR VIEW VISION FOR SPECTACLES

For a long, long time people have recognized that it can be desirable for eye glasses or spectacles to be adapted in such a way as to allow the person wearing them to look in a different direction, such as to the side or more usually to the rear. A number of patents have issued disclosing reflective means to accomplish this result, but the various kinds of eye glasses proposed for this purpose have been unsatisfactory for a number of reasons. The most usual reason is that the ability to see behind oneself is frequently accomplished by means of an appendage or accessory that is awkward in appearance as in the case of Jiranek U.S. Pat. No. 2,175,896 or LaBard U.S. Pat. No. 2,917,970.

In U.S. Pat. No. 1,359,576 there is disclosed a way for seeing in reverse direction wherein a reflective member is incorporated in the glass itself. Such a device better meets the test of unobtrusive, attractive appearance but nevertheless, is subject to at least two significant drawbacks. In the first place it is expensive to incorporate the reflective means in the glass itself. Perhaps more importantly such a device is essentially incapable of adjustment. The angle of reflection is dependent on the curvature of the lens itself, and it requires that the lens be constructed with such curvature and contour as will cause the active reflecting area to be at the correct angle regardless of the optical requirements of the person wearing the glasses. Similarly, U.S. Pat. No. 1,359,110 includes a reflector affixed directly to a lens surface, whereby it is not adjustable and is likely to be concave in surface.

GENERAL NATURE OF THE INVENTION

The present invention provides inexpensive means for providing in eye glasses a reflection at a desired angle. The reflection means is herein termed an opter, which is intended to denote a reflection element or assembly adapted to provide the wearer with rear vision. The reflecting mechanism is located at the rear edge of the lens, entirely or nearly completely within the circumference of the lens. It is easily, permanently attachable to the lens itself and can be given a minor adjustment for an angle or reflection so as to compensate for possible differences in curvature of the surface of the lens. If desired, the reflection mechanism may be affixed to the lens by the original manufacturer or optician but it is presently preferred that the reflection mechanism be separately supplied and be affixed to the lens after it is sold to and fitted to the wearer and adjusted as desired by the person who wears the glasses.

The invention can be more easily understood by referring to the drawings in which.

Figure 1:
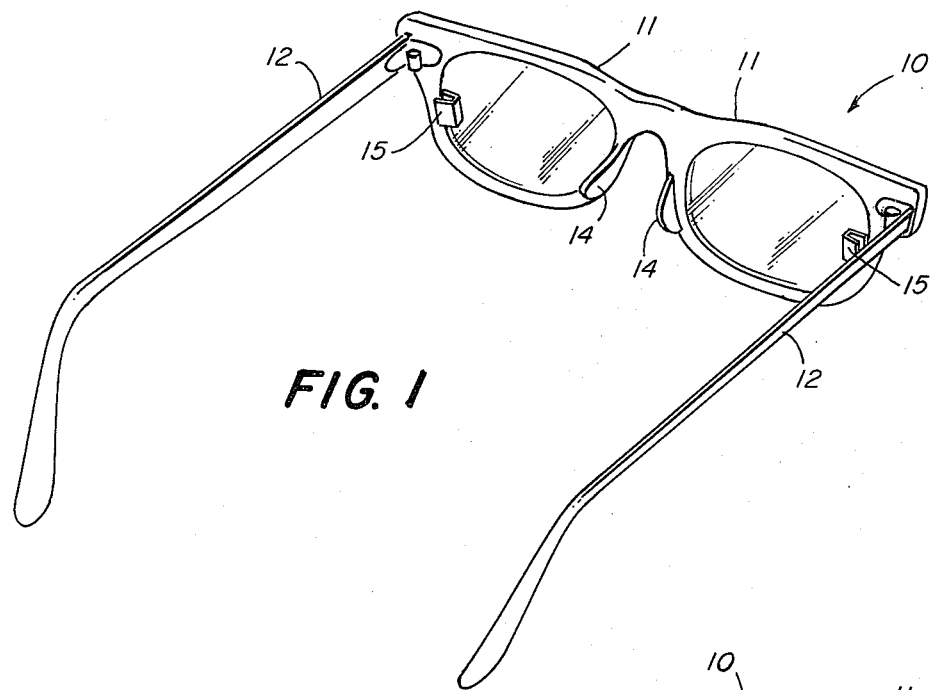
FIG. 1 is a perspective view of a pair of spectacles or glasses according to one embodiment of the present invention.
Figure 2:
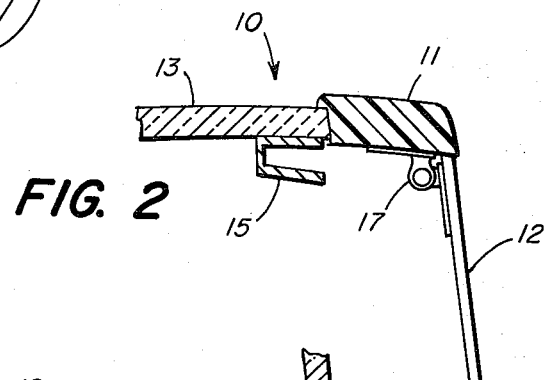
FIG. 2 is a top view, partly in section, illustrating a a portion of a pair of spectacles according to one embodiment of the invention.

In FIG. 1 is shown a pair of spectacles or eye glasses generally designated 10 including a frame 11 and a pair of temple pieces 12 and lenses 13, (Note: FIG.2). Conventional rest members 14 are positioned to permit the spectacles to rest against the nose of the person wearing them. Mounted on the rear or inward surface of the lenses themselves are two opters, 15 or like reflection mechanisms. These mechanisms are positioned at a suitable location generally near the side edge of the lens. As illustrated, the reflecting mechanism or opter 15, may be positioned closely adjacent to the point at which the temples are secured to the lens or frame.

At the present time it is quite usual for spectacles to include relatively large lenses which cover not only the area immediately in front of the eye but also areas at the sides, the bottom, and the top of the normal field of vision. Such relatively large lenses are more usual with dark colored glasses or sunglasses and are particularly desirable for use in connection with the present invention. It is desired that the reflection members 15 be positioned sufficiently far to the side so that they do not block important segments of the normal field of vision, and also sufficiently far to the side so that they can reflect directly behind the person wearing glasses. When the opters are positioned outside the one of the head and face it is possible to use these reflecting members to see directly backwards without even turing the head.

In FIG. 2 is shown a portion of the glasses or spectacles 10 of FIG. 1. The illustrated portion includes part of the frame 11, the lens 13 and the reflection member 15. Also shown is a mounting post 17 by which the temple 12 is secured to the frame 17.

Figure 3:
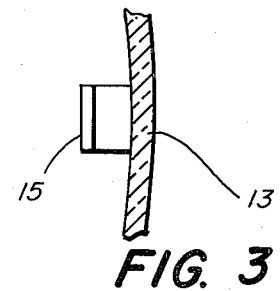
FIG. 3 is a side cross section of the device shown in FIG. 1 and 2.

In FIG. 3 is illustrated a portion of the spectacles including a lens 13 and an opter 15, positioned thereon.

Figure 4:
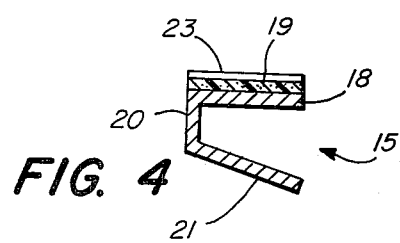
FIG. 4 is a cross section of the reflection mechanism per se of the embodiment shown in FIG. 1.

FIG. 4 illustrates the reflection mechanism 15 including a mounting base 18 having thereon a fastening means 19, a support arm 20 and a reflection surface 21. The mounting base is a relatively small member adapted to fit against and to be secured directly to a lens without the need for altering the lens or drilling a hole therein or other operation which might damage the lens. The fastening means 19 may be an adhesive coating, and according to the presently preferred embodiment of the invention fastening means 19 is such an adhesive coating. Any suitable glue may be used which will adhere to glass. It is desirable that the glue be resistant to moisture. It is presently preferred that the fastening means be a permanently tacky or permanently sticky glue which is protected until use by means of a covered protection layer 23 which can be peeled off to expose the tacky glue. The support arm 20, joins the reflection surface 21, to the mounting base 18 and is pliable or easily bent, but not resilient. It can be permanently distorted or bent by means of moderate pressure. Most soft metals are satisfactory for this purpose except that one should avoid spring steel or a metal which acts in a springing manner to return the support arm to its original shape when pressure is released. In the alternative a hinge member (not shown) may join the support arm to the reflection surface.

To prepare the spectacles according to FIG. 1, a reflection mechanism 15, is first prepared for installation on the spectacles by activating the fastening means 19. If a permanently tacky adhesive is employed its protection cover 23 is removed and the reflection mechanism is then placed against the rearwardly facing surface of lens 13. Thereafter the reflection surface is moved to the desired angle by slightly bending support arm 20.

When the person who wears the glasses places them on his face in the normal position he can then look out of the corner of his eye and see in the reflection surface 21 a back view of whatever is behind him.

As illustrated in FIG. 1 there is a reflection mechanism 15 on each lens 13 positioned closely adjacent to the temple 12. If desired, only a single reflection mechanism may be used on either the left or the right lens. The reflection surface may be flat or essentially a plane surface but desirably it will be slightly convex so that the field of vision in the reflection surface is substantially wider. In addition, the reflection surface of the opter may also be ground or shaped to provide an optically corrected reflection for those with severe visual deficiencies. Further, the entire opter assembly may be transparent or may be so constructed and shaped as not to interfere with vision, and the reflecting surface may be partially reflective and partially transparent whereby rear vision is achieved without totally blocking out forward vision in the opter area.

Figure 5:
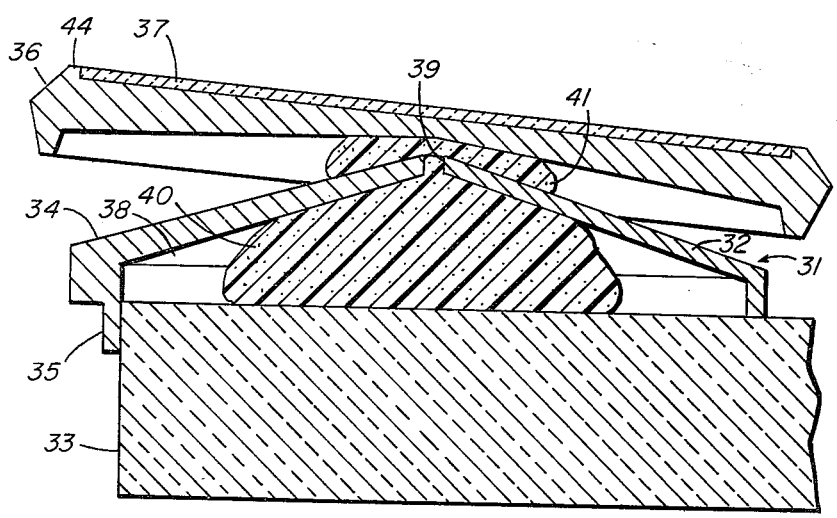
FIG. 5 is a cross section of a reflecting means on a lens, according to another embodiment of the invention.

In FIG. 5 is illustrated another embodiment of the invention. In this form of the invention, lens 33 has mounted on it a support base generally designated 31 positioned with one edge thereof at the edge of the lens 33 (or of the frame of the spectacles, not shown in FIG. 5) and directed to the desired location by the means of guides 35. These guides 35 may be any positioning or locating means. A simple such means is illustrated in the form of a projection or abutment member adapted to be placed against the edge of the lens 13.

The opter support base 31 has a convex or rearwardly (toward the eye of the wearer) projecting panel 32 which with side walls 34 around the perimeter of the panel forms a small, generally cup-shaped chamber 38 or space between panel 32 and lens 33. Within this chamber 38 an adhesive 40 secures the support base 31 to the lens 33. At a point in the rearwardly facing panel 32, perferably at the peak or center of this panel is a small opening or pinhole 39. Positioned outside the support base, in the position away from lens 33, is a mirror 37 secured in a frame 36. Desirably side walls 44 surround the mirror which fits relatively snuggly within these walls. The mirror may be secured within the mirror frame by suitable means such as for example, a layer or spot of adhesive. The inner edge (projecting downward in FIG. 5) of side walls 44 of frame 36 are adapted to fit around base 31 in such a way that base 31 can fit within the recessed frame 36. Thus when mirror frame 36 is tipped in one direction or another for adjustment, base 31 fits in and additionally supports frame 36.

The entire assembly of support base and mirror can be affixed if desired to lens 33 by an optician but one of the purposes and advantages of the present invention is that this assembly can be mounted on the lens by the user himself. Adhesive 40 preferably is a cohesive pad generally of putty-like consistency, being relatively firm and pliable. It is intended that the assembly will be sold with a small pad of the proper adhesive of approximately the right size for the purpose. The adhesive is placed on the inner surface of the support base 31, the support base is positioned so that guides 35 bear against the edge of the lens or support frame and then the edge of base 31 is pressed against lens 33. Air escapes through the pinholes 39, allowing a good firm fit. It is not neccessary to wait for the adhesive to become fully hard, but as soon as the support base 31 is firmly in position against lens 33 the mirror can be secured thereto. A second adhesive 41 is placed on the exposed surface against this adhesive. The adhesive 41 also is generally of putty-like consistency and desirably will harden in about $\frac{1}{4}$ to $\frac{1}{2}$ hour.

The angular position of the mirror 37 is adjusted while this adhesive 41 is still soft. The user positions the mirror at what is believed to be the correct angle vertically and horizontally on the spectacles. Adjustment, if needed, is easy with the still soft pliable adhesive 41. When the proper adjustment has been achieved this adhesive 41 is allowed to harden in the correct orientation. The entire operation of mounting and adjusting the mirror requires about one minute, and after standing about $\frac{1}{2}$ hour the mirror is permanently mounted in the desired position.

I claim:

1. Rearview reflection means for spectacles comprising:
   a mounting base having a base surface shaped to fit against the rearward surface of a spectacle lens,
   securing means to secure the base surface against a spectacle lens,
   a reflection surface,
   a support member for said reflection surface joining said reflection surface to said mounting base approximately parallel with the base surface of said mounting base, said support member and mounting base being two separate elements adapted to be fixed together by means of an adhesive, said adhesive being originally a putty-like pad adapted to harden to a rigid mass, whereby said support member is originally adjustable to provide that the reflection surface can be adjusted to a desired rearward viewing angle.

2. Rear view spectacles according to claim 1, wherein one face of an element of said support member is adapted to be fixed against and wholly on said lens surface and wherein the opposite face of said first element is an outwardly cup shaped panel to permit a second element to be fitted thereagainst adjustably with respect to its angular position relative to said lens.

* * * * *